US012749701B2

(12) United States Patent
Jiang et al.

(10) Patent No.: US 12,749,701 B2
(45) Date of Patent: Sep. 29, 2026

(54) SYSTEM AND METHOD FOR A BATTERY CELL WITH AN OXYGEN GAS SCAVENGER

(71) Applicant: GM GLOBAL TECHNOLOGY OPERATIONS LLC, Detroit, MI (US)

(72) Inventors: Meng Jiang, Rochester Hills, MI (US); Louis G. Hector, Jr., Shelby Township, MI (US); Erik B. Golm, Sterling Heights, MI (US); Meinan He, Birmingham, MI (US); Yangbing Zeng, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 738 days.

(21) Appl. No.: 18/183,549

(22) Filed: Mar. 14, 2023

(65) Prior Publication Data

US 2024/0313257 A1 Sep. 19, 2024

(51) Int. Cl.
*H01M 10/0525* (2010.01)
*H01M 10/0585* (2010.01)
*H01M 10/52* (2006.01)

(52) U.S. Cl.
CPC ... *H01M 10/0525* (2013.01); *H01M 10/0585* (2013.01); *H01M 10/52* (2013.01)

(58) Field of Classification Search
None
See application file for complete search history.

(56) References Cited

U.S. PATENT DOCUMENTS 5,445,856 A * 8/1995 Chaloner-Gill ......... B32B 15/20 428/323
2011/0143204 A1* 6/2011 Paik ................. H01M 10/4235 429/223
2011/0217592 A1* 9/2011 Gunji ................... H01M 4/131 429/223
2020/0212482 A1* 7/2020 Makino ................ H01M 4/625
2020/0295326 A1* 9/2020 Qiao ...................... B60L 50/64
2020/0313250 A1* 10/2020 Norton, Jr. .......... H01M 10/523
2021/0028452 A1* 1/2021 Su .......................... H01M 4/50
2021/0242497 A1* 8/2021 Herzog ............. H01M 10/0567
2024/0304880 A1* 9/2024 Jiang .................. H01M 50/109

FOREIGN PATENT DOCUMENTS

JP 07220698 A * 8/1995
WO WO-2008148778 A1 * 12/2008 ............ H01M 10/42

OTHER PUBLICATIONS

JP 07-220698 A Machine Translation (Year: 1995).*
CN 114307952 Abstract Translation (Year: 2022).*
(Continued)

*Primary Examiner* — Kevin M Bernatz
(74) *Attorney, Agent, or Firm* — Quinn IP Law

(57) ABSTRACT

A battery cell is provided. The battery cell includes an external container and an electrode stack disposed within the external container. The electrode stack includes at least one pair of an anode and a cathode. The battery cell further includes an electrolyte disposed within the external container and an $O_2$ scavenger material disposed within the external container. The $O_2$ scavenger material is configured for absorbing oxygen gas generated within the electrode stack.

7 Claims, 9 Drawing Sheets

(56) References Cited

OTHER PUBLICATIONS

CN 110911774 Abstract Translation (Year: 2020).*
JP 2013-089284 Abstract Translation (Year: 2013).*
KR 2013024595 Abstract Translation (Year: 2013).*
KR 2015014888 Abstract Translation (Year: 2015).*
KR 2021033705 Abstract Translation (Year: 2021).*
KR 2021083995 Abstract Translation (Year: 2021).*

* cited by examiner

FIG. 2
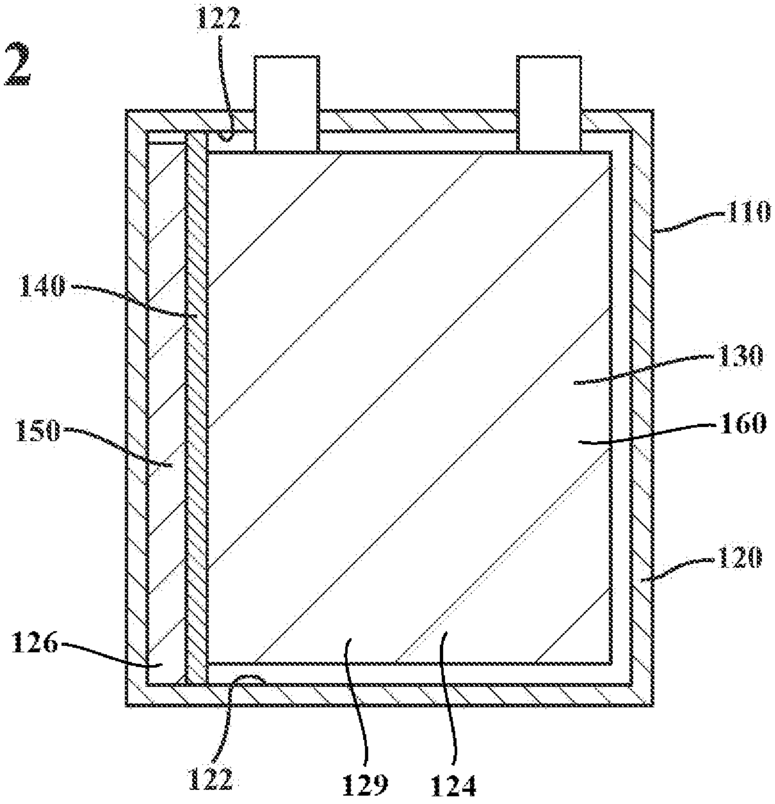
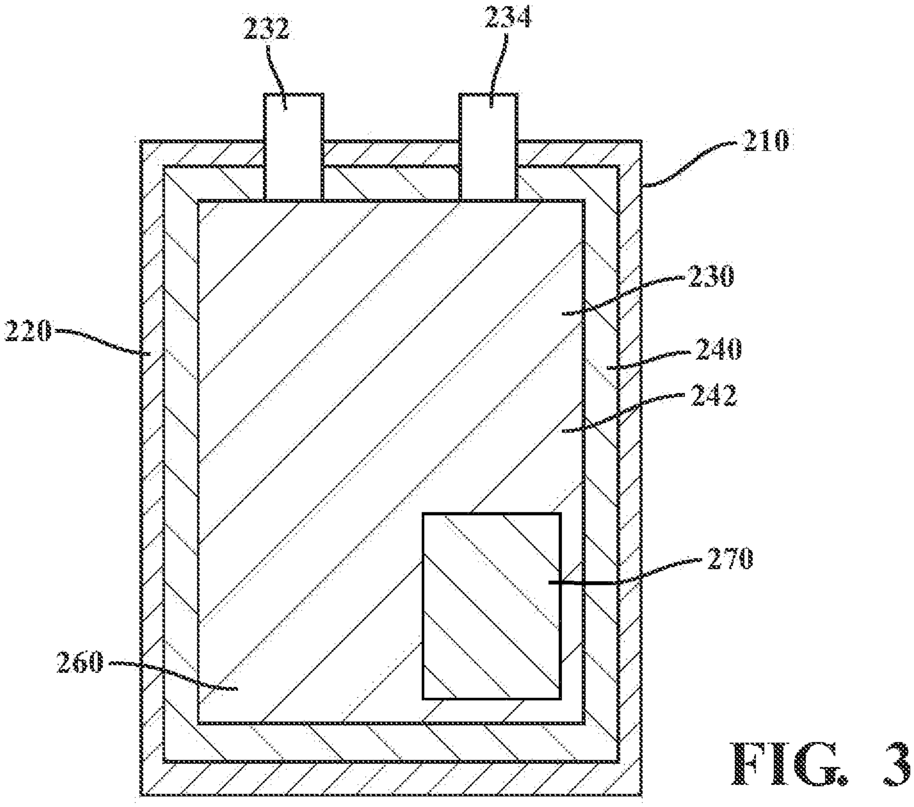
FIG. 3

FIG. 5
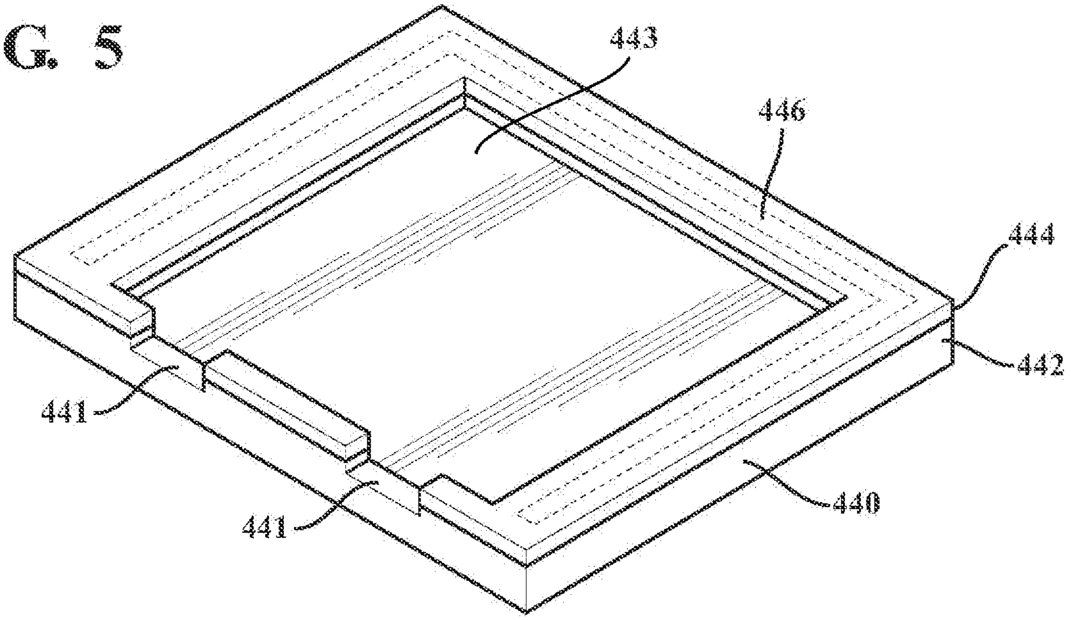
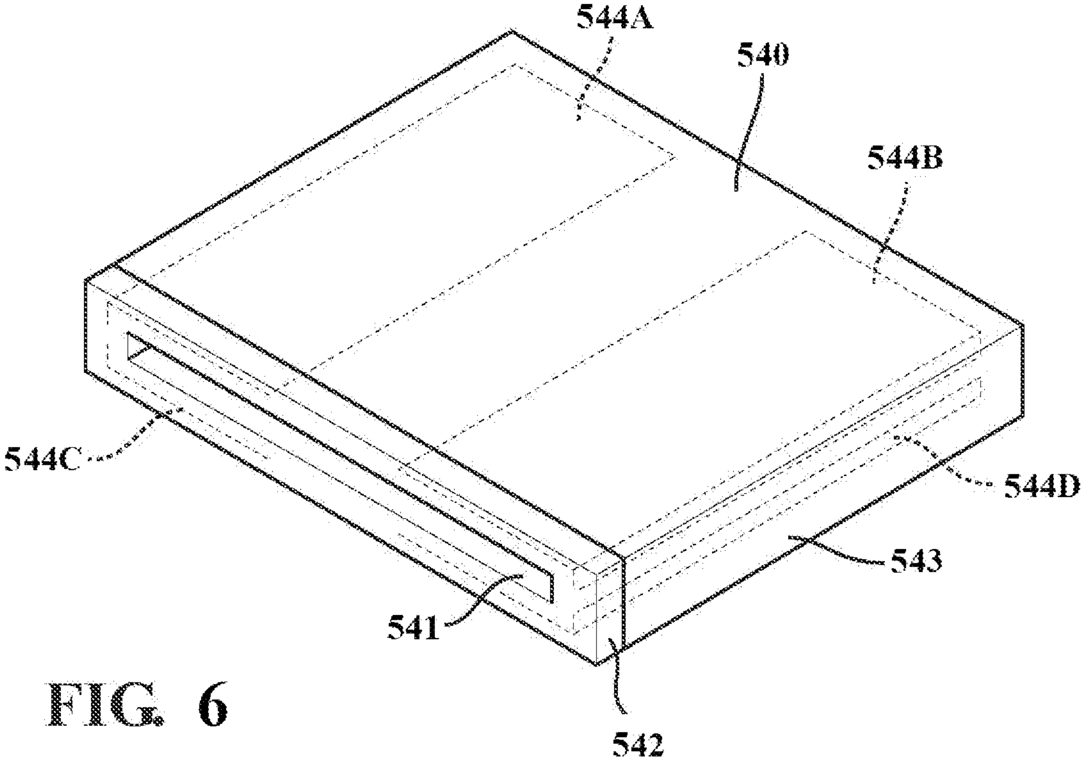
FIG. 6

SYSTEM AND METHOD FOR A BATTERY CELL WITH AN OXYGEN GAS SCAVENGER

INTRODUCTION

The present disclosure relates to a system and method for a battery cell with an oxygen gas scavenger.

Lithium-ion batteries and lithium metal batteries are desirable candidates for powering electronic devices in the consumer, automotive, naval, marine, and aerospace industries due to their relatively high energy density, high power density, lack of memory effect, and long cycle life, as compared to other rechargeable battery technologies, including lead-acid batteries, nickel-cadmium and nickel-metal-hydride batteries. The widespread commercialization of lithium batteries, however, is dependent upon their ensured performance under normal operating conditions, in the event of manufacturing defects, upon aging, as well as under a variety of abuse conditions, including exposure to high temperatures, overcharge, over-discharge, and exposure to external forces that physically damage one or more internal components thereof. Conditions that affect the thermal, chemical, electrical, and/or physical stability of lithium batteries may increase the internal temperature of such batteries, which may, in turn, set-off additional undesirable events and/or chemical reactions within the batteries that may lead to additional heat generation.

Battery cells are produced in different configurations. Pouch battery cells may be flat, thin battery cells encased in a flexible pouch and may be useful to stack a plurality of the pouch battery cells in a relatively small package space. Can battery cells may be encased in a rigid, protective case. Examples of can battery cells may include examples of prismatic battery cells, which may include a rectangular outer case, and cylindrical battery cells. Cylindrical battery cells are generally cylindrical and may be encased within a hard cylindrical-shape case, and may include a jellyroll electrode stack or a flexible electrode stack configured as an Archimedean spiral. Coin battery cells are generally cylindrical and may include an electrode stack including a plurality of coin-shaped or disc-shaped components.

SUMMARY

A battery cell is provided. The battery cell includes an external container and an electrode stack disposed within the external container. The electrode stack includes at least one pair of an anode and a cathode. The battery cell further includes an electrolyte disposed within the external container and an $O_2$ scavenger material disposed within the external container. The $O_2$ scavenger material is configured for absorbing oxygen gas generated within the electrode stack.

In some embodiments, the $O_2$ scavenger material is inert with respect to the anode, the cathode, and the electrolyte.

In some embodiments, the external container includes an interior wall surface. The $O_2$ scavenger material includes a layer applied to the interior wall surface.

In some embodiments, the pair of the anode and the cathode include a separator disposed between the anode and the cathode. The $O_2$ scavenger material includes a layer applied to the separator.

In some embodiments, the anode includes an anode electrode, and the $O_2$ scavenger material is mixed with material of the anode electrode.

In some embodiments, the cathode includes a cathode electrode, and the $O_2$ scavenger material is mixed with material of the cathode electrode.

In some embodiments, the $O_2$ scavenger material includes one of a ferrous carbonate ($FeCO_3$)/metal halide mixture, $Na_2SO_3$, or $Fe(OH)_2$.

In some embodiments, the electrode stack is a coiled electrode stack including an $O_2$ scavenger layer, an anode layer, a separator layer, and a cathode layer. The $O_2$ scavenger layer includes the $O_2$ scavenger material contained within a gas permeable packet.

In some embodiments, the $O_2$ scavenger material is reactive with or interferes with one of the anode, the cathode, or the electrolyte. The battery cell further includes a gas permeable barrier configured for enabling the oxygen gas to flow through the gas permeable barrier and for preventing the electrolyte from contacting the $O_2$ scavenger material. An internal compartment of the external container is segmented into a first portion and a second portion by the gas permeable barrier. The electrode stack and the electrolyte are disposed within the first portion. The $O_2$ scavenger material is disposed within the second portion.

In some embodiments, the $O_2$ scavenger material includes one of lithium metal, iron metal, sodium metal, sodium chloride, hydrazine ($N_2H_4$), carbohydrazide ($CH_6N_4O$), diethylhydroxylamine ($C_4H_{11}NO$), methylethyl ketone oxime ($C_4H_9NO$), sodium erythorbate ($C_6H_7NaO_6$), tris (trimethylsilyl) phosphite (TMSPi), triethyl phosphite (TEPi), ethylene sulfite (ES), or (2,2,6,6-tetramethylpiperidin-1-yl)oxidanyl (TEMPO).

In some embodiments, the gas permeable barrier is a frame surrounding the electrode stack. The second portion is a hollow region of the frame. The $O_2$ scavenger material is disposed within the hollow region of the frame.

In some embodiments, the frame is constructed with one of a polymer including polytetrafluoroethylene (PTFE), poly (1,1,2,2 tetrafluoroethylene), or a sulfonated tetrafluoroethylene-based fluoropolymer-copolymer or a metal including stainless steel, aluminum, copper, or alloys thereof.

In some embodiments, the gas permeable barrier is a gas permeable packet, and the $O_2$ scavenger material is contained within the gas permeable packet.

In some embodiments, the battery cell is a prismatic can battery cell, a cylindrical-shaped battery cell, or a coin battery cell.

In some embodiments, the battery cell is a pouch battery cell, and the external container includes a flexible pouch.

According to one alternative embodiment, a method to create a battery cell is provided. The method includes coating or infusing an internal component of the battery cell with an $O_2$ scavenger material. The $O_2$ scavenger material is inert with respect to an anode and a cathode of the battery cell. The method further includes assembling the battery cell including the internal component of the battery cell. The method further includes utilizing the $O_2$ scavenger material to absorb oxygen gas generated by the cathode.

In some embodiments, the internal component includes an internal wall of an external container, a separator disposed between the anode and the cathode, an anode electrode of the anode, or a cathode electrode of the cathode.

According to one alternative embodiment, a method to create a battery cell is provided. The method includes segmenting an internal compartment of the battery cell with a gas permeable barrier to create a first portion of the internal compartment and a second portion of the internal compartment. The method further includes disposing an electrode stack of the battery cell within the first portion of the internal compartment and disposing an $O_2$ scavenger material within the second portion of the internal compartment. The method further includes utilizing the $O_2$ scavenger material to absorb oxygen gas generated by or within a cathode of the electrode stack.

In some embodiments, segmenting the internal compartment of the battery cell includes disposing the electrode stack of the battery cell within a frame configured for surrounding the electrode stack. The frame includes the gas permeable barrier. The frame further includes a hollow region. The second portion is the hollow region. Disposing an $O_2$ scavenger material within the second portion includes disposing the $O_2$ scavenger material within the hollow region.

In some embodiments, the gas permeable barrier includes a gas permeable packet. The second portion is an interior of the gas permeable packet. The $O_2$ scavenger material is disposed within the interior of the gas permeable packet.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 2 schematically illustrates in cross-section an alternative exemplary battery cell including an $O_2$ scavenger material that may be reactive with materials of an electrode stack of the battery cell, in accordance with the present disclosure;

FIG. 3 schematically illustrates an additional alternative exemplary battery cell which includes a frame surrounding an electrode stack, wherein the frame includes a gas permeable portion, in accordance with the present disclosure;

FIG. 5 schematically illustrates in perspective view an exemplary frame including a gas permeable portion and an $O_2$ scavenger material contained within a hollow portion of the frame, in accordance with the present disclosure;

FIG. 6 schematically illustrates in perspective view an additional exemplary frame including a gas permeable portion, in accordance with the present disclosure;

DETAILED DESCRIPTION

Figure 1:
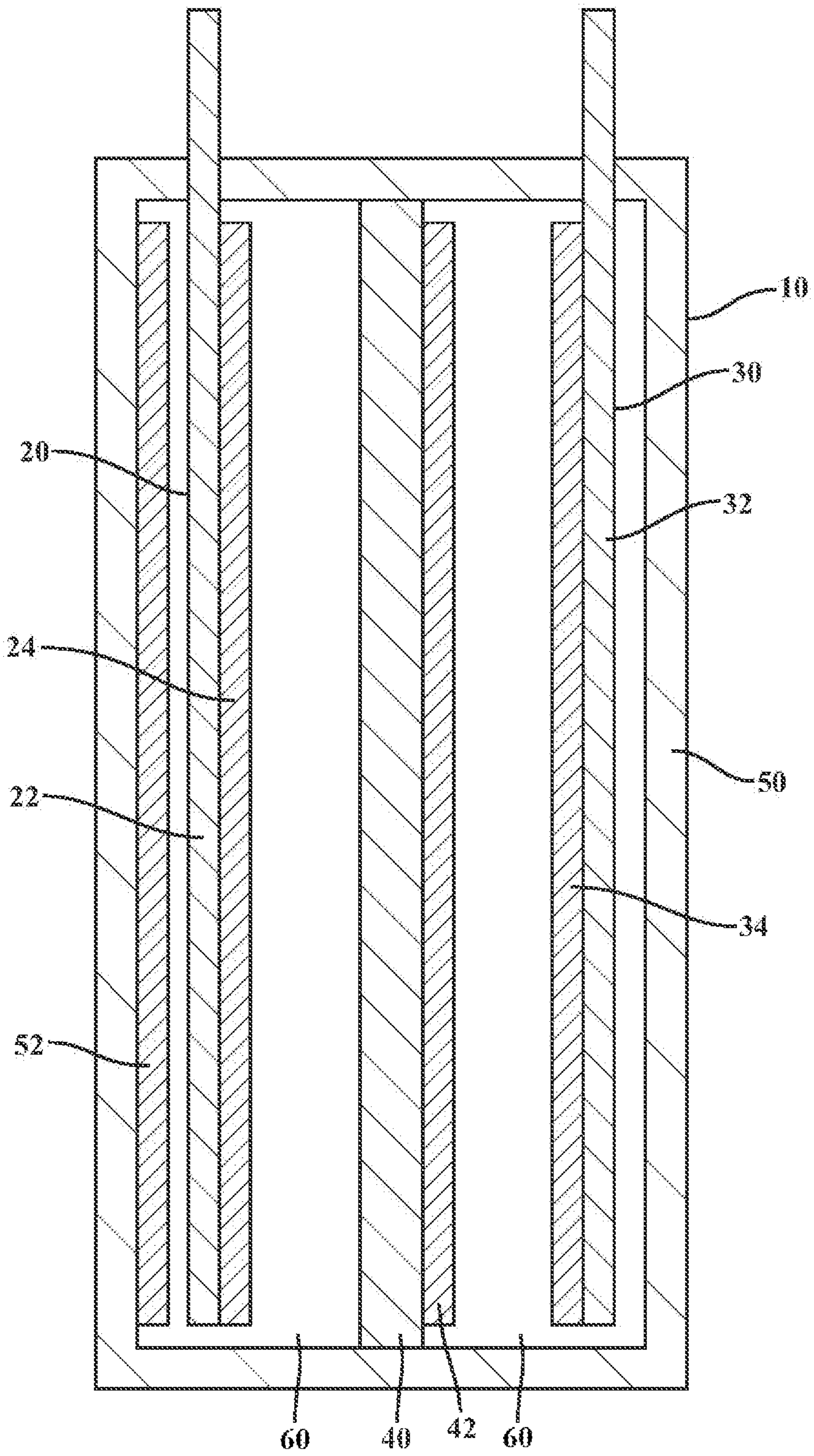
FIG. 1 schematically illustrates in cross-section an exemplary battery cell including an anode, a cathode, a separator, an external container, and an electrolyte, in accordance with the present disclosure.

A battery system may include a plurality of battery cells. A battery cell may include an anode electrode, a cathode electrode, a separator, and an electrolyte.

A battery cell includes electrochemically reactive materials. The anode electrode includes anode active materials selected to electrochemically react with cathode active materials of the cathode electrode. Chemical reactions may happen between the electrode materials and electrolyte, or, in the event of thermal runaway, gas will be generated. In some instances, oxygen gas ($O_2$) may be produced. Production and presence of $O_2$ in a system or environment may be problematic and turn into unintended combustion. An oxygen scavenger or a $O_2$ scavenger is a material or device installed to a system that absorbs $O_2$, thereby preventing the $O_2$ from reacting with other materials present in the system.

A battery cell is provided including an $O_2$ scavenger within the battery cell. The $O_2$ scavenger may be useful to prevent unintended combustion. The $O_2$ scavenger may be useful to delay unintended combustion and may be paired with an alert system to warn a user that an unintended event is taking place.

In some embodiments, an $O_2$ scavenger may include a material that is or materials that are inert with respect to the reactive materials within the battery. In such an embodiment, the $O_2$ scavenger may be disposed in contact with or within a reactive environment of the reactive components of the battery, for example, in contact with the anode and the cathode. By disposing the $O_2$ scavenger in direct contact with or in close proximity to the reactive components of the battery, the $O_2$ scavenger may be in an excellent location to absorb $O_2$ as it is produced by the reactive components.

In some embodiments, an $O_2$ scavenger may include a material or materials that may react with or interfere with other materials within the battery. In such an embodiment, the $O_2$ scavenger may be disposed within the battery outside of a reactive environment of the reactive components of the battery. For example, a gas permeable barrier such as a porous material or a gas diffusion membrane, permitting gas flow across the gas permeable barrier while preventing an electrolyte from crossing the gas permeable barrier, may be utilized to separate the $O_2$ scavenger from the reactive components of the battery while enabling $O_2$ to be absorbed by the $O_2$ scavenger.

The gas permeable barrier may be a gas permeable packet, containing the $O_2$ scavenger within the packet and enabling gas to pass through the packet.

The gas permeable barrier may be a wall segmenting an internal compartment of the battery cell. Such a wall may be constructed with a porous material or a gas diffusion membrane and may seal with walls of an external container or envelope of the battery cell to retain an electrolyte on one side of the wall while permitting gas flow across the wall. In another embodiment, the reactive components of the battery cell including the anode and the cathode and a liquid or solid-state electrolyte may be surrounded by a frame or container, wherein a portion of the frame includes a gas permeable material, such that $O_2$ produced within the frame may exit the frame. The $O_2$ scavenger may be disposed within a hollow region of the frame, such that the reactive chemicals of the reactive components within the frame do not react with the materials of the $O_2$ scavenger, but $O_2$ may still flow from within the frame to the $O_2$ scavenger.

The disclosed frame may be configured for use within a pouch battery cell, a prismatic can battery cell, a cylindrical can battery cell, or a coin cell configuration. Dimensions of the frame, e.g. a height and a width, may depend upon dimensions of the battery cell and the electrode stack being contained within the frame. A thickness of the frame, wherein the electrode stack is planar or flat, may be slightly thicker than the electrode stack, may be slightly thinner than the electrode stack, or may be substantially a same thickness as the electrode stack. In one embodiment, an outer width of the frame may be in a range from 1 millimeter to 50 millimeters, and a corresponding width of a central hollow portion within the frame may be in a range from 0.5 millimeters to 49 millimeters.

A material of the frame may be a polymer such as polytetrafluoroethylene (PTFE), poly (1,1,2,2 tetrafluoroethylene), or a sulfonated tetrafluoroethylene-based fluoropolymer-copolymer. The material of the frame may alternatively be a metal such as stainless steel, aluminum, copper, or alloys thereof.

An external surface of the frame and an internal surface of an outer enclosure such as a pouch or a prismatic can may be utilized as a functional material container, for example, including material configured to absorb moisture or oxygen gas.

In one embodiment, an $O_2$ scavenger may be disposed within a hollow wall of the frame, with a porous material or a gas diffusion membrane permitting $O_2$ to flow from a central hollow portion containing the reactive components of the battery cell to the $O_2$ scavenger disposed outside of the frame.

Referring now to the drawings, wherein like reference numbers refer to like features throughout the several views, FIG. 1 schematically illustrates in cross-section an exemplary battery cell 10 including an anode 20, a cathode 30, a separator 40, an external container 50, and an electrolyte 60. The external container 50 may include an outer surface external to the battery cell and is not necessarily external to a system or viewable by a user. The anode 20 is illustrated including a current collector 22 and an anode electrode 24. The anode electrode 24 may include an anode active material, a conductive material, and a binder. The cathode 30 is illustrated including a current collector 32 and a cathode electrode 34. The cathode electrode 34 may include a cathode active material, a conductive material, and a binder. The anode 20, the cathode 30, and the electrolyte 60 may be described as reactive components of the battery cell 10. The electrolyte 60 is in contact with the anode 20 and the cathode 30 and facilitates electrochemical reactions therebetween. The shapes and locations of the current collectors 22, 32 are non-limiting examples, and other battery cell configurations are envisioned.

The battery cell 10 may be a pouch battery cell, a prismatic can battery cell, a cylindrical-shaped battery cell, or a coil battery cell. A pouch battery cell may include a thin, flexible pouch for the external container 50. A prismatic can battery cell or a cylindrical-shaped battery cell may include a rigid material such as metal or a polymer for the external container 50.

An $O_2$ scavenger may include a material that is or materials that are inert with respect to the reactive materials within the battery. An $O_2$ scavenger layer 52 is illustrated applied to an inside wall of the external container 50. An $O_2$ scavenger layer 42 is illustrated applied to the separator 40. The separator 40 may be a planar piece with a first primary surface and a second primary surface. The $O_2$ scavenger layer 42 may in some embodiments be applied to both primary surfaces of the separator 40. When applied to the separator 40, the $O_2$ scavenger layer 42 may be porous or otherwise configured to permit ion transfer through the $O_2$ scavenger layer 42. In one embodiment, the $O_2$ scavenger layer 42 or the $O_2$ scavenger layer may be embodied as a pouch filled with $O_2$ scavenger material.

In one embodiment, an $O_2$ scavenger may be intermixed with other materials and formed within the anode electrode 24. In another embodiment, an $O_2$ scavenger may be intermixed with other materials and formed within the cathode electrode 34. An $O_2$ scavenger may be formed within an electrode by mixing $O_2$ scavenger particles with the other particles of the electrode in a solvent slurry, applying the slurry to the current collector, and drying the slurry upon the current collector.

The electrolyte 60 may be a liquid electrolyte. A solid-state electrolyte, a gel electrolyte, or a quasi-solid-state electrolyte may alternatively be utilized in combination with an $O_2$ scavenger.

$O_2$ scavengers that may be inert with respect to the reactive materials within the battery may include a ferrous carbonate ($FeCO_3$)/metal halide mixture, $Na_2SO_3$, or $Fe(OH)_2$.

$O_2$ scavengers are illustrated in FIG. 1 within the $O_2$ scavenger layer 52, the $O_2$ scavenger layer 42, the anode electrode 24, and the cathode electrode 34. The disclosed battery cell may include an $O_2$ scavenger in one of these locations, some of these locations, or each of these locations. These locations are exemplary, and an $O_2$ scavenger may be disposed in other locations within the battery cell in accordance with the disclosure.

FIG. 2 schematically illustrates in cross-section an alternative exemplary battery cell 110 including an $O_2$ scavenger material 150 that may be reactive with materials of an electrode stack 130 of the battery cell 110. The battery cell 110 is illustrated including an external container 120, an electrode stack 130, a gas permeable barrier 140, the $O_2$ scavenger material 150, and an electrolyte 160. The external container 120 includes internal walls 122 which define a rectangular internal compartment 129. The internal compartment 129 is divided into two portions by the gas permeable barrier 140, a first portion 124, which contains the electrode stack 130 and the electrolyte 160, and a second portion 126, which contains the $O_2$ scavenger material 150. The gas permeable barrier 140 may be adhered, thermally joined, or otherwise sealed to the internal walls 122 to prevent the electrolyte 160 from passing through or around the gas permeable barrier 140. In another embodiment, the gas permeable barrier 140 may include a gas permeable, enclosed packet with $O_2$ scavenger materials inside. Gas generated within the first portion 124 may pass through the gas permeable barrier 140 into the second portion 126, where $O_2$ may be absorbed by the $O_2$ scavenger 150. The electrolyte 160 is contained within the first portion 124 by the gas permeable barrier 140. $O_2$ scavengers that may be reactive to components of the battery cell 110 may include lithium metal, iron metal, sodium metal, sodium chloride, hydrazine ($N_2H_4$), carbohydrazide ($CH_6N_4O$), diethylhydroxylamine ($C_4H_{11}NO$), methylethyl ketone oxime ($C_4H_9NO$), or sodium erythorbate ($C_6H_7NaO_6$). $O_2$ scavengers that may be reactive to components of the battery cell 110 may alternatively include tris(trimethylsilyl) phosphite (TMSPi), triethyl phosphite (TEPi), ethylene sulfite (ES), or (2,2,6,6-tetramethylpiperidin-1-yl)oxidanyl (TEMPO).

FIG. 2 describes a battery cell 110 wherein an internal compartment 129 of the battery cell 110 is segmented into a first portion 124 and a second portion 126 by a gas permeable barrier 140, such that an $O_2$ scavenger material 150 that is reactive with materials within the electrode stack 130 may be utilized. The battery cell 110 may additionally or alternatively utilize $O_2$ scavenger material that is inert with respect to the materials within the electrode stack 130. For example, an inert $O_2$ scavenger material may additionally be utilized to coat an internal wall of the external container 120, or the inert $O_2$ scavenger material may be used in place of the material of the $O_2$ scavenger material 150.

FIG. 3 schematically illustrates an additional alternative exemplary battery cell 210 which includes a frame 240 surrounding an electrode stack 230, wherein an $O_2$ scavenger packet 270 is provided within the frame 240. The battery cell 210 is illustrated including an external container 220 and the electrode stack 230 including a first current collector 232 and a second current collector 234, both projecting from the external container 220. The shapes and locations of the first current collector 232 and the second current collector 234 are non-limiting examples, and other battery cell configurations are envisioned. The battery cell 210 is further illustrated including the frame 240 including a hollow central portion 242 configured for containing the electrode stack 230 and an electrolyte 260 therewithin. In some embodiments, the frame 240 may be constructed with a polymer including polytetrafluoroethylene (PTFE), poly (1,1,2,2 tetrafluoroethylene), or a sulfonated tetrafluoroethylene-based fluoropolymer-copolymer. In other embodiments, the frame 240 may be constructed with a metal including stainless steel, aluminum, or copper. The frame 240 may surround the electrode stack 230 in three dimensions. In another embodiment, the frame 240 may surround the electrode stack 230 in two dimensions and appear like a picture frame, with the frame being attached or otherwise sealed to an inner surface of the external container 220 to segment an interior compartment of the external container 220 and prevent liquid from passing through or past the frame 240. In some embodiments, the frame 240 may be omitted.

The battery cell 210 includes the $O_2$ scavenger packet 270. The $O_2$ scavenger packet 270 is illustrated covering a portion of the electrode stack 230. The $O_2$ scavenger packet 270 may be a same width and height as the electrode stack 230, and the battery cell 210 may include multiple or a plurality of the $O_2$ scavenger packets 270. The $O_2$ scavenger packet 270 is disposed within the hollow central portion 242. A pouch or outer layer of the $O_2$ scavenger packet 270 may include a gas permeable membrane configured to permit gas to enter the $O_2$ scavenger packet 270 while preventing the electrolyte 260 from entering the $O_2$ scavenger packet 270. Gas generated within the electrode stack 230 may enter the $O_2$ scavenger packet 270 and be absorbed or otherwise neutralized.

Figure 4:
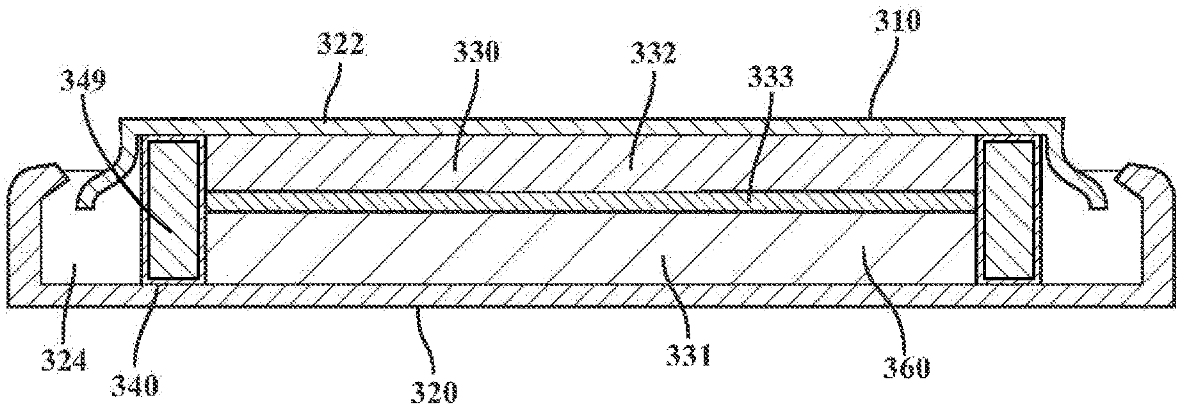
FIG. 4 schematically illustrates in cross-section an exemplary coin battery cell including an $O_2$ scavenger material, in accordance with the present disclosure.

FIG. 4 schematically illustrates in cross-section an exemplary coin battery cell 310 including an $O_2$ scavenger material. The coin battery cell 310 is illustrated including an external container 320, an anode cap 322, and a gasket material 324 preventing the external container 320 from directly contacting the anode cap 322. The coin battery cell 310 is further illustrated including an anode 330, a cathode 331, a separator 333, and an electrolyte 360. The coin battery cell 310 further includes an annular $O_2$ scavenger structure 340. The annular $O_2$ scavenger structure 340 may include a ring-shaped packet with $O_2$ scavenger material 349 contained therewithin. In another embodiment, the annular $O_2$ scavenger structure 340 may include a ring-shaped frame constructed with a gas permeable material with $O_2$ scavenger material 349 contained in a hollow region of the ring-shaped frame therewithin. The annular $O_2$ scavenger structure 340 contains the $O_2$ scavenger material 349 within the annular $O_2$ scavenger structure 340. In some embodiments, wherein the $O_2$ scavenger material 349 is not inert with respect to the electrolyte 360, the annular $O_2$ scavenger structure 340 is configured for preventing the electrolyte 360 from coming into contact with the $O_2$ scavenger material 349 within the annular $O_2$ scavenger structure 340. In another embodiment, interior surfaces of the external container 320 or the anode cap 322 may be coated with an $O_2$ scavenger material. In another embodiment, the gasket 324 may be coated with or infused with an $O_2$ scavenger material. In another embodiment, the anode 330, the cathode 331, or the separator 332 may be coated with or formed integrally with an $O_2$ scavenger material.

FIG. 5 schematically illustrates in perspective view an exemplary frame 440 including a gas permeable portion 444 and an $O_2$ scavenger material 446 contained within a hollow portion of the frame 440. The frame 440 is configured for receiving and containing an electrode stack within a hollow central portion 443. The frame includes two slots 441 formed to receive and fixture current conductors of the electrode stack to be placed within the hollow central portion 443. The frame 440 is hollow and includes the $O_2$ scavenger material 446 contained within the hollow portion of the frame 440. The frame 440 includes a rigid material 442 and the gas permeable portion 444. The gas permeable portion 444 may be in direct contact with or may provide a flow path for gas exiting the hollow central portion 443 to come into contact with the $O_2$ scavenger material 446.

FIG. 6 schematically illustrates in perspective view an additional exemplary frame 540 including a gas permeable portion 542. The frame 540 is illustrated including a hollow central portion 541, the gas permeable portion 542, and a rigid material 543. The frame 540 is hollow and includes a first $O_2$ scavenger material 544A, a second $O_2$ scavenger material 544B, a third $O_2$ scavenger material 544C, and a fourth $O_2$ scavenger material 544D. The $O_2$ scavenger material 544A, 544B, 544C, 544D are identified distinctly to show that in one embodiment, four exemplary individual hollow areas of the frame 540 may be filled with the $O_2$ scavenger material. The $O_2$ scavenger material 544A, 544B, 544C, 544D may be substantially identical. The $O_2$ scavenger material 544A, 544B, 544C, 544D may alternatively be a single, continuous hollow area filled with the $O_2$ scavenger material. The $O_2$ scavenger materials 544A, 544B, 544C, 544D are jacketed around the hollow central portion 541 and come into contact with or are configured to receive a flow of gas through the gas permeable portion 541. The frame 540 of FIG. 5 and the frame 540 of FIG. 6 may each be utilized within an external container of a corresponding battery cell.

Figure 7:
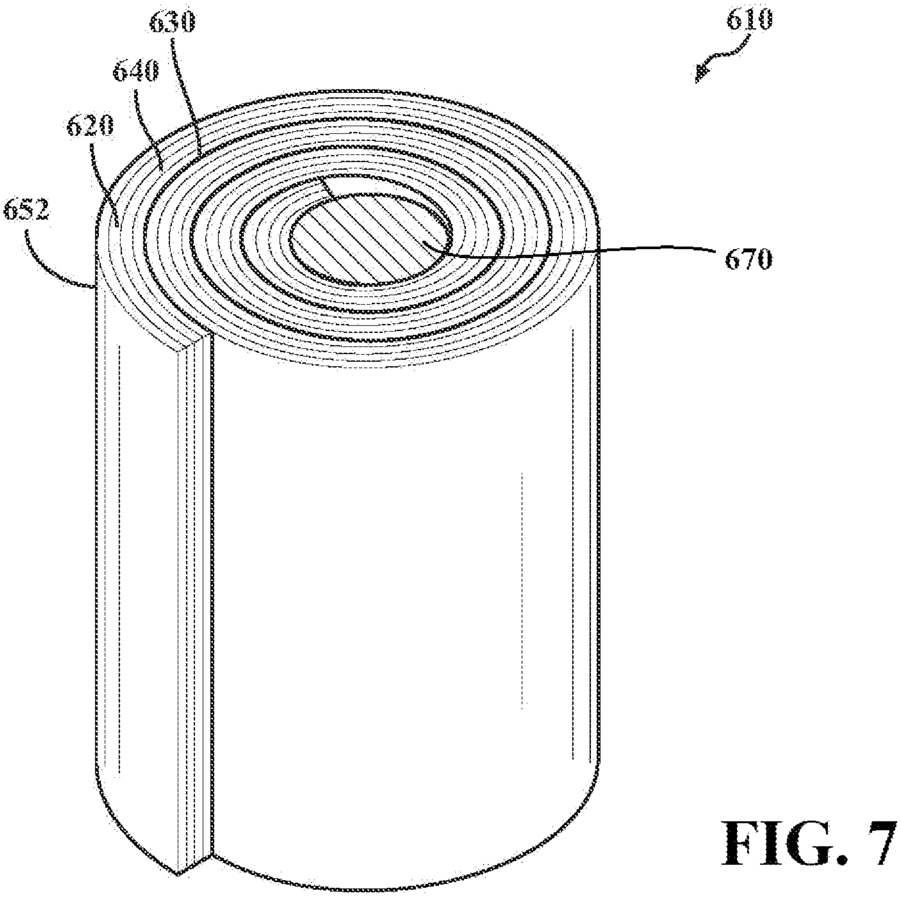
FIG. 7 schematically illustrates in perspective view a coiled electrode stack configured for use within a cylindrical-shaped battery cell, in accordance with the present disclosure.

FIG. 7 schematically illustrates in perspective view a coiled electrode stack 610 configured for use within a cylindrical-shaped battery cell. In one embodiment, the $O_2$ scavenger layer 630 includes an initially flat, planar, gas permeable packet filled with the $O_2$ scavenger which is subsequently processed and rolled as part of the coiled electrode stack 610. The coiled electrode stack 610 further includes a coiled anode 620 and a coiled cathode 640 with a coiled separator therebetween. The coiled electrode stack 610 may include an Archimedean spiral shape. The coiled electrode stack 610 may be coiled or rolled around a core 670. By being coiled within the coiled electrode stack 610 and in direct contact with the other components of the coiled electrode stack 610, the $O_2$ scavenger material 652 is in an excellent condition to absorb $O_2$ generated by cathode decomposition or by electrolyte decomposition.

Figure 8:
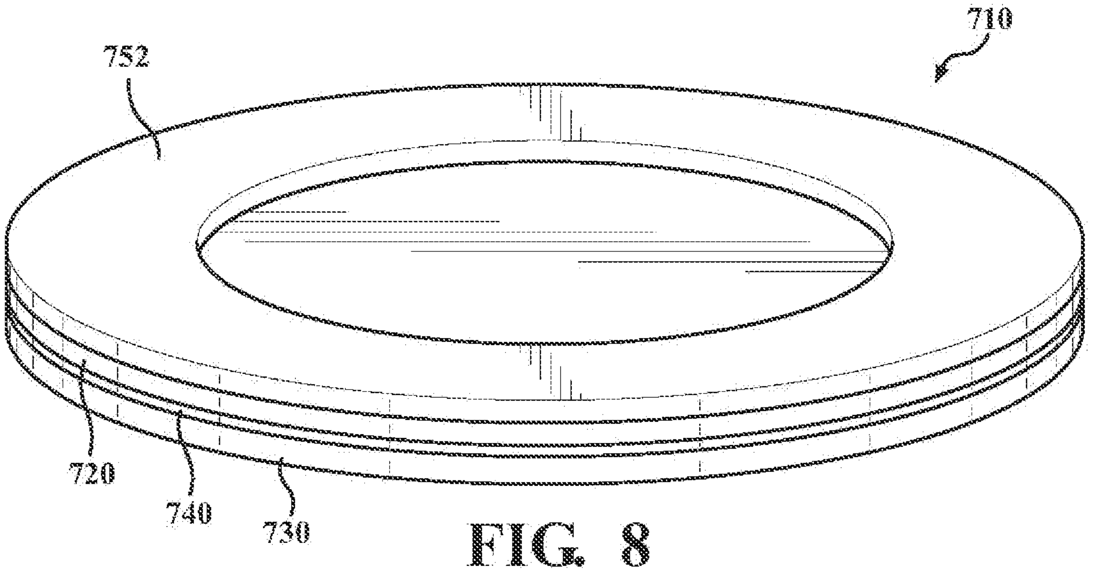
FIG. 8 schematically illustrates in perspective view an electrode stack configured for use within a coin battery cell, in accordance with the present disclosure.

FIG. 8 schematically illustrates in perspective view an electrode stack 710 configured for use within a coin battery cell. An $O_2$ scavenger layer 752 includes materials that are inert with respect to the reactive materials within the other components of the electrode stack 710. The electrode stack 710 includes the $O_2$ scavenger layer 752, an anode layer 720, a separator layer 740, and a cathode layer 730. The electrode stack 710 is configured for use within a coin battery cell similar to the battery cell 310 of FIG. 4, with the exception that the annular frame 340 is unnecessary as the $O_2$ scavenger layer 752 may be in a same environment as the anode layer 720 and the cathode layer 730 due to the inert nature of the $O_2$ scavenger layer 752.

Figure 9:
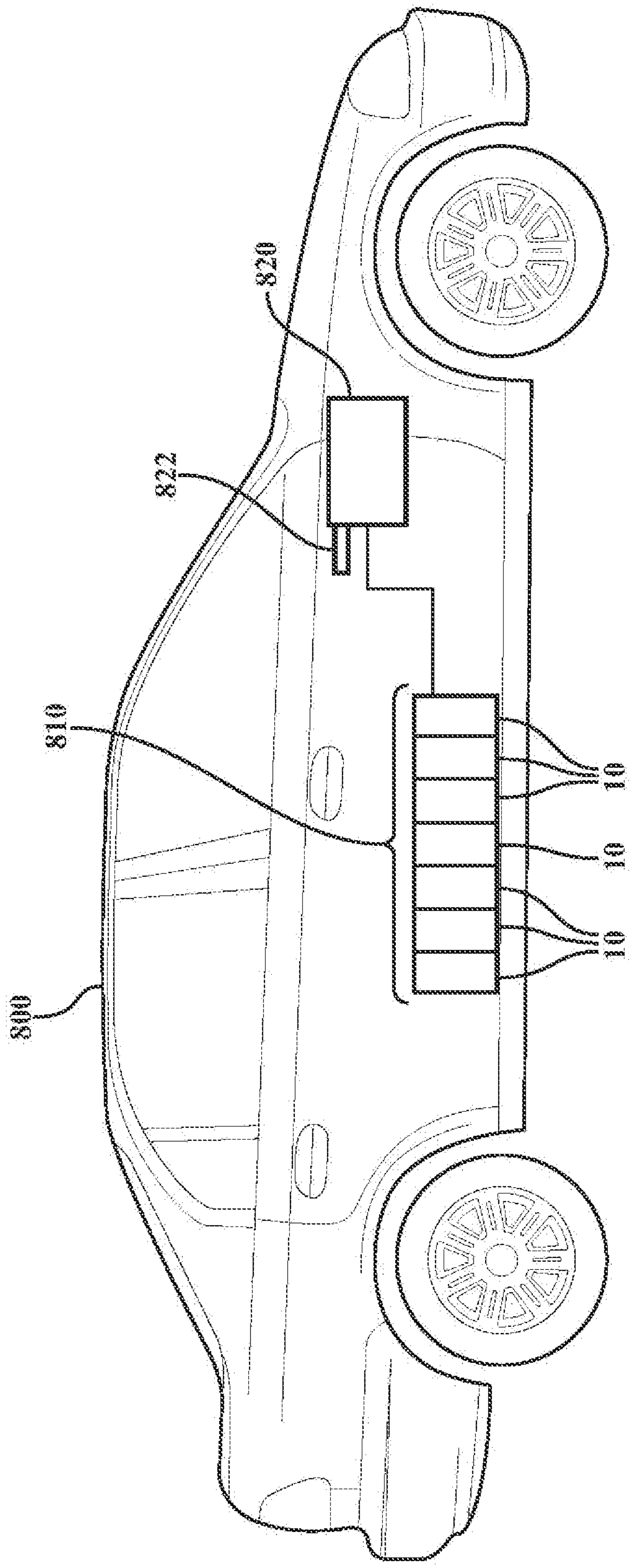
FIG. 9 schematically illustrates an exemplary device including a battery pack that includes a plurality of battery cells, in accordance with the present disclosure.

The battery cells 10, 110, 210, 310 may be utilized in a wide range of applications and powertrains. FIG. 9 schematically illustrates an exemplary device 800, e.g., a battery electric vehicle (BEV), including a battery pack 810 that includes a plurality of battery cells 10. The plurality of battery cells 10 may be connected in various combinations, for example, with a portion being connected in parallel and a portion being connected in series, to achieve goals of supplying electrical energy at a desired voltage. The battery pack 810 is illustrated as electrically connected to a motor generator unit 820 useful to provide motive force to the device 800. The motor generator unit 820 may include an output component 822, for example, an output shaft, from which mechanical energy results sufficient to provide the motive force to the device 800. A number of variations to device 800 are envisioned, for example, including a powertrain, a boat, or an airplane, and the disclosure is not intended to be limited to the examples provided.

Figure 10:
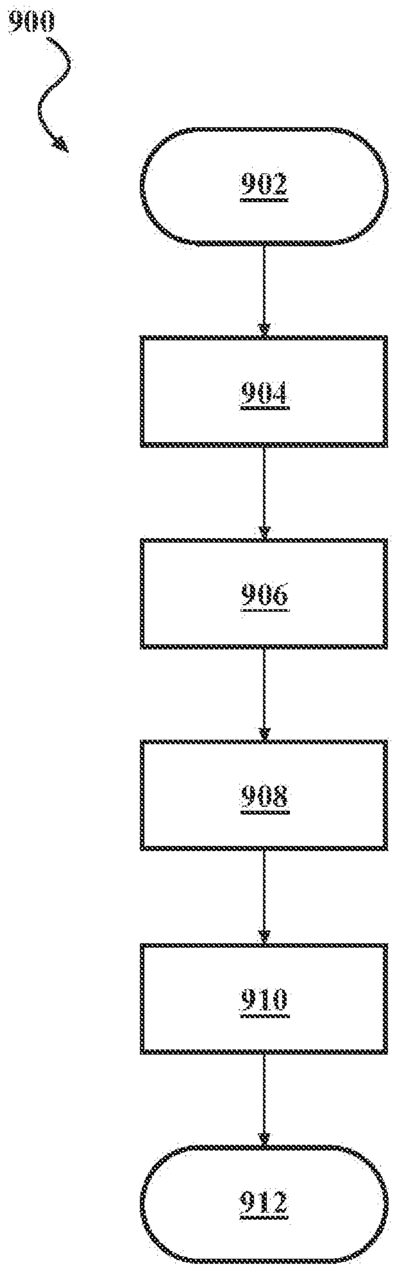
FIG. 10 is a flowchart illustrating a method for manufacturing the battery cell of FIG. 1, wherein the $O_2$ scavenger material is inert with respect to the reactive materials of the anode and the cathode, in accordance with the present disclosure.

FIG. 10 is a flowchart illustrating a method 900 for manufacturing the battery cell 10 of FIG. 1, wherein the $O_2$ scavenger material is inert with respect to the reactive materials of the anode 20, the cathode 30, and the electrolyte 60. While the method 900 is described in relation to the battery cell 10 of FIG. 1, the method 900 may be similarly applied in relation to other similar battery cell configurations. The method 900 starts at step 902. At step 904, a component of the battery cell 10 is coated or infused with an $O_2$ scavenger material. As is described in relation to FIG. 1, the $O_2$ scavenger material may be within the $O_2$ scavenger layer 52, the $O_2$ scavenger layer 42, the anode electrode 24, or the cathode electrode 34. At step 906, the electrode stack is disposed within the external container 50. At step 908, an electrolyte 60 is disposed within the external container 50. At step 910, the battery cell 10 is sealed. The sealed battery cell 10 is ready to be utilized within a wide variety of devices and applications. At step 912, the method 900 ends. The method 900 is an exemplary method or process to manufacture the disclosed battery cell 10. A number of additional and/or alternative method steps are envisioned, and the disclosure is not intended to be limited to the examples provided herein.

Figure 11:
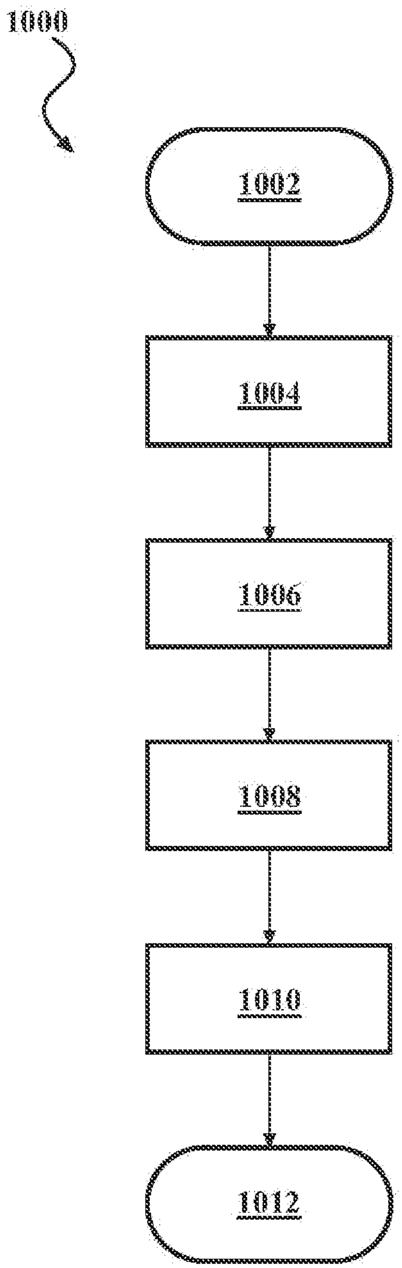
FIG. 11 is a flowchart illustrating a method for manufacturing the battery cell of FIG. 3, wherein the electrode stack is disposed within the frame and the $O_2$ scavenger material is disposed within the battery cell and outside of the frame, in accordance with the present disclosure.

FIG. 11 is a flowchart illustrating a method 1000 for manufacturing the battery cell 210 of FIG. 3, wherein the electrode stack 230 and the $O_2$ scavenger packet 270 are disposed within the battery cell 210. While the method 1000 is described in relation to the battery cell 210 of FIG. 3, the method 1000 may be similarly applied in relation to other similar battery cell configurations. The method 1000 starts at step 1002. At step 1004, the electrode stack 230 and at least one $O_2$ scavenger packet 270 is disposed within the frame 240. At step 1006, the frame 240, the electrode stack 230, and the $O_2$ scavenger packet(s) 270 are disposed within the external container 220. At step 1008, the electrolyte 260 is disposed within the frame 240. At step 1010, the battery cell 210 is sealed. The battery cell 210 is ready to be utilized within a wide variety of devices and applications. At step 1012, the method 1000 ends. The method 1000 is an exemplary method or process to manufacture the disclosed battery cell 210. A number of additional and/or alternative method steps are envisioned, and the disclosure is not intended to be limited to the examples provided herein.

Figure 12:
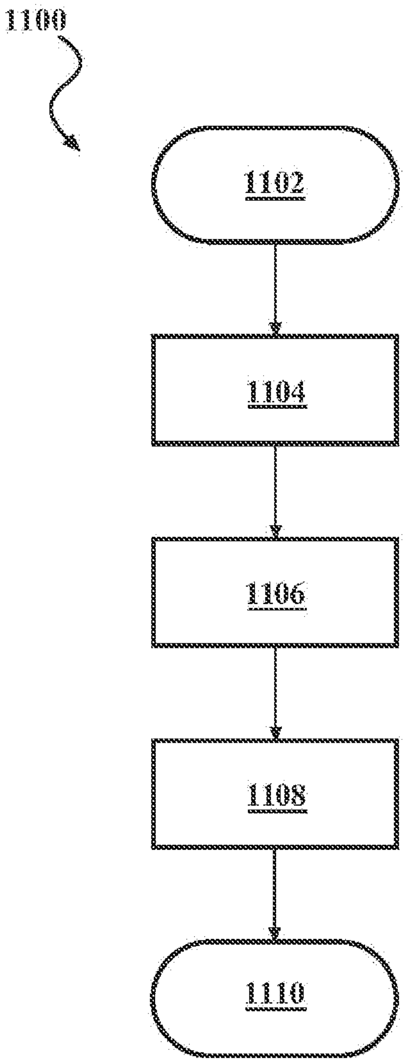
FIG. 12 is a flowchart illustrating a method for manufacturing one of the anode or the cathode of FIG. 1 including oxygen scavenger material integrated within an electrode of the anode or the cathode, in accordance with the present disclosure.

FIG. 12 is a flowchart illustrating a method 1100 for manufacturing one of the anode 20 or the cathode 30 of FIG. 1 including oxygen scavenger material integrated within an electrode of the anode 20 or the cathode 30. While the method 1100 is described in relation to the anode 20 or the cathode 30 of FIG. 1, the method 1100 may be similarly applied in relation to other anode and cathode configurations. The method 1100 starts at step 1102. At step 1104, particles of oxygen scavenger material, particles of electrode active materials, particles of a polymer binder such as polyvinylidene fluoride (PVDF), and particles of conductive additives such as carbon black are mixed within a solvent such as n-methyl-2-pyrrolidone (or 1-methyl-2-pyrrolidone) (NMP) to create a slurry. The binder may be present in an amount from 0.5 percent by weight to 20 percent by weight based upon a total weight of the particles in the slurry. The oxygen scavenger material may be present in an amount from 0.5 percent by weight to 10 percent by weight based upon a total weight of the particles in the slurry. The conductive materials may be present in an amount from 0.5 percent by weight to 20 percent by weight based upon a total weight of particles in the slurry. The active material may be present in an amount from 50 percent by weight to 98.5 percent by weight as compared to a total weight of particles in the slurry. At step 1106, the slurry is applied as a coating to a current collector, which, in one embodiment, may include a metal foil. The coating may be applied to one side or two sides of the current collector. At step 1108, the coating is dried or cured upon the current collector. Once dried upon the current collector, the coating functions as the electrode. At step 1110, the method 1100 ends. The method 1100 is an exemplary method or process to manufacture the anode 20 or the cathode 30 of FIG. 1, wherein the electrode of the anode 20 or the cathode 30 includes oxygen scavenger materials. A number of additional and/or alternative method steps are envisioned, and the disclosure is not intended to be limited to the examples provided herein.

Figure 13:
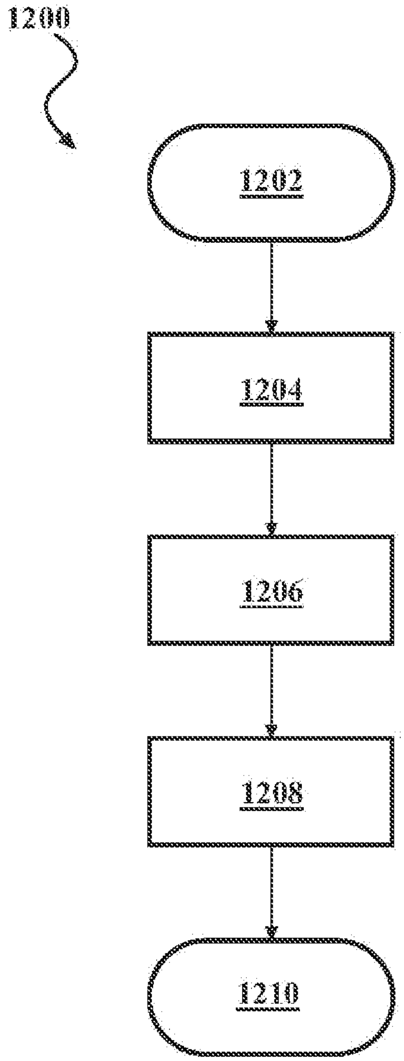
FIG. 13 is a flowchart illustrating a method for manufacturing the separator of FIG. 1, wherein the separator includes at least one layer of oxygen scavenging material, in accordance with the present disclosure.

FIG. 13 is a flowchart illustrating a method 1200 for manufacturing the separator 40 of FIG. 1, wherein the separator 40 includes at least one layer of oxygen scavenging material. While the method 1200 is described in relation to the battery cell 10 of FIG. 1, the method 1200 may be similarly applied in relation to other similar battery cell configurations. The method 1200 starts at step 1202. At step 1204, particles of oxygen scavenger material and particles of a polymer binder such as PVDF are mixed within a solvent such as NMP to create a slurry. The binder may be present in an amount from 0.5 percent by weight to 50 percent by weight based upon a total weight of the particles in the slurry. The oxygen scavenger material may be present in an amount from 50 percent by weight to 99.5 percent by weight based upon a total weight of the particles in the slurry. At step 1206, the slurry is applied as a coating to the separator 40. The coating may be applied to one side or two sides of the separator 40. At step 1208, the coating is dried or cured upon the separator 40. At step 1210, the method 1200 ends. The method 1200 is an exemplary method or process to manufacture the separator 40 of FIG. 1, wherein the separator 40 includes oxygen scavenger materials. A number of additional and/or alternative method steps are envisioned, and the disclosure is not intended to be limited to the examples provided herein.

Figure 14:
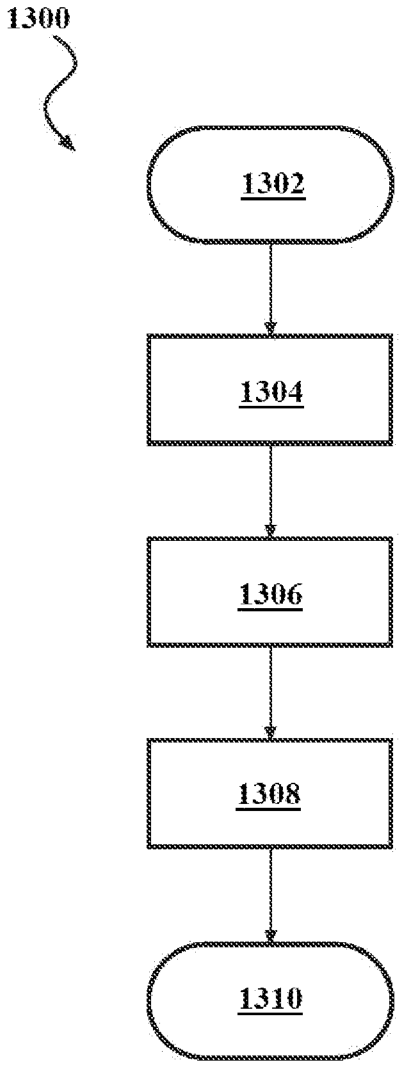
FIG. 14 is a flowchart illustrating a method for manufacturing the external container of FIG. 1, wherein the external container includes at least one layer of oxygen scavenging material on an internal surface of the external container, in accordance with the present disclosure.

FIG. 14 is a flowchart illustrating a method 1300 for manufacturing the external container 50 of FIG. 1, wherein the external container 50 includes at least one layer of oxygen scavenging material on an internal surface of the external container 50. While the method 1300 is described in relation to the battery cell 10 of FIG. 1, the method 1300 may be similarly applied in relation to other similar battery cell configurations. The external container 50 may be embodied as a flexible pouch. The method 1300 starts at step 1302. At step 1304, particles of oxygen scavenger material and particles of a polymer binder such as PVDF are mixed within a solvent such as NMP to create a slurry. At step 1306, the slurry is applied as a coating to the external container 50. At step 1308, the coating is dried or cured upon the external container 50. At step 1310, the method 1300 ends. The method 1300 is an exemplary method or process to manufacture the external container 50 of FIG. 1, wherein the external container 50 includes oxygen scavenger materials. A number of additional and/or alternative method steps are envisioned, and the disclosure is not intended to be limited to the examples provided herein.

While the best modes for carrying out the disclosure have been described in detail, those familiar with the art to which this disclosure relates will recognize various alternative designs and embodiments for practicing the disclosure within the scope of the appended claims.

What is claimed is:

1. A battery cell comprising:

an external container;

an electrode stack disposed within the external container; wherein the electrode stack is a coiled electrode stack comprising an anode layer, a separator layer, a cathode layer, and an $O_2$ scavenger layer;

wherein the $O_2$ scavenger layer is coiled together with the anode layer, the separator layer, and the cathode layer as part of the coiled electrode stack; and an electrolyte disposed within the external container;

wherein the $O_2$ scavenger layer comprises an $O_2$ scavenger material contained within a gas permeable packet that is configured to permit oxygen gas generated within the coiled electrode stack to enter the gas permeable packet and be absorbed by the $O_2$ scavenger material, and to prevent the electrolyte from entering the gas permeable packet and contacting the $O_2$ scavenger material.

2. The battery cell of claim 1, wherein the $O_2$ scavenger material is inert with respect to the anode, the cathode, and the electrolyte.

3. The battery cell of claim 2, wherein the $O_2$ scavenger material includes one of a ferrous carbonate ($FeCO_3$)/metal halide mixture, $Na_2SO_3$, or $Fe(OH)_2$.

4. The battery cell of claim 1, wherein the battery cell is a cylindrical-shaped battery cell.

5. The battery cell of claim 1, wherein the battery cell is a pouch battery cell; and wherein the external container includes a flexible pouch.

6. A method to create a battery cell, the method comprising:

coiling an anode layer, a separator layer, a cathode layer, and an $O_2$ scavenger layer together to form a coiled electrode stack, wherein the $O_2$ scavenger layer comprises an $O_2$ scavenger material contained within a gas permeable packet, and wherein the gas permeable packet is configured to permit oxygen gas generated within the coiled electrode stack to enter the gas permeable packet and be absorbed by the $O_2$ scavenger material, and to prevent an electrolyte from entering the gas permeable packet and contacting the $O_2$ scavenger material;

disposing the coiled electrode stack within an external container;

disposing the electrolyte within the external container; and utilizing the $O_2$ scavenger material to absorb oxygen gas generated within the coiled electrode stack.

7. The method of claim 6, wherein the internal component includes an internal wall of an external container, a separator disposed between the anode and the cathode, an anode electrode of the anode, or a cathode electrode of the cathode.

* * * * *